(12) United States Patent
Webb

(10) Patent No.: US 6,282,154 B1
(45) Date of Patent: Aug. 28, 2001

(54) PORTABLE HANDS-FREE DIGITAL VOICE RECORDING AND TRANSCRIPTION DEVICE

(76) Inventor: Howarlene S. Webb, 83 Mautucket Rd., Wakefield, RI (US) 02879-5023

( * ) Notice: Subject to any disclaimer, the term of this patent is extended or adjusted under 35 U.S.C. 154(b) by 0 days.

(21) Appl. No.: 09/184,935

(22) Filed: Nov. 2, 1998

(51) Int. Cl.[7] .................................................. G11B 19/00
(52) U.S. Cl. ............................................... 369/25; 379/75
(58) Field of Search .......................... 369/25–26, 27–28, 369/29, 7; 704/275, 235; 379/75, 67.1, 68

(56) References Cited

U.S. PATENT DOCUMENTS

| 4,839,857 | 6/1989 | Mersiovsky et al. | 369/25 |
|---|---|---|---|
| 4,908,866 | 3/1990 | Goldwasser et al. | 369/25 X |
| 5,235,571 | 8/1993 | Ellermeier | 369/25 |
| 5,265,075 | 11/1993 | Bergeron et al. | 369/25 |
| 5,353,259 | 10/1994 | Howes et al. | 369/25 |
| 5,398,220 | * 3/1995 | Barker | 369/25 |
| 5,477,511 | 12/1995 | Englehardt | 369/25 |
| 5,502,694 | * 3/1996 | Kwoh et al. | 369/25 |
| 5,548,566 | * 8/1996 | Barker | 369/25 |
| 5,818,800 | * 10/1998 | Barker | 369/25 |
| 5,995,936 | * 11/1999 | Brais et al. | 704/275 |
| 6,038,199 | * 3/2000 | Pawlowski et al. | 369/25 |

* cited by examiner

Primary Examiner—Ali Neyzari
(74) Attorney, Agent, or Firm—Kenneth L. Tolar

(57) ABSTRACT

A portable hands-free documentation system includes a headset microphone in communication with a portable recording unit having analog-to-digital and digital-to-analog conversion means therein. The portable unit further includes means for recording digital data to and reading digital data from a removable data storage medium, such as a high capacity removable computer disk. The unit also includes an output means for transmitting analog signals to a computer wherein the signals are automatically converted to text using voice recognition software.

14 Claims, 4 Drawing Sheets

PORTABLE HANDS-FREE DIGITAL VOICE RECORDING AND TRANSCRIPTION DEVICE

BACKGROUND OF THE INVENTION

The present invention relates to sound recording devices and, more particularly, to a portable hands-free device that digitally records and converts speech to text.

DESCRIPTION OF THE PRIOR ART

Doctors, nurses, and other health care workers often document various procedures by using a dictation device. The dictated material must eventually be transcribed. However, because a health care worker's hands must be used to perform certain procedures, dictation is not always possible and the healthcare worker must rely on his or her memory to transcribe the events at a later time. Any such delay in documenting a procedure can compromise the accuracy and detail thereof. Furthermore, such delays are often to be expected, as distractions, such as medical emergencies, are commonly encountered. The accuracy of such documentation can be crucial, however, particularly when the quality of the medical care becomes the subject of litigation.

In addition, health care workers often must ordinarily carry paper and/or forms on which certain patient information is immediately documented. Transporting and handling such documents is inconvenient. The present invention satisfies the above described problems by providing a portable device attachable to a user's clothing which digitally records and formats speech so that the speech may be automatically transcribed using voice recognition software.

The prior art includes a number of devices designed to record speech for playback or transcription. For example, U.S. Pat. No. 5,265,075, issued to Bergeron et al., entitled "VOICE PROCESSING SYSTEM WITH EDITABLE VOICE FILES" discloses a central dictation system which includes prerecorded standard voice files that can be selected, edited and later transcribed by the user.

Another example is disclosed in U.S. Pat. No. 4,908,866, issued to Goldwasser et al., entitled "SPEECH TRANSCRIBING SYSTEM". The Goldwasser et al. patent discloses a speech transcription apparatus which is capable of receiving speech from a plurality of individuals via dictation stations. A transcriber may immediately transcribe the speech from an individual under the control of a FIFO buffer memory.

U.S. Pat. No. 4,839,857, issued to Mersiovsky et al., entitled "SYSTEM FOR FACILITATING THE CONTROL OF AUDIO INFORMATION WITHIN A WORD PROCESSING DOCUMENT WITH AUDIO INPUT" discloses a word processing system that notifies the user when his or her voice is too soft or loud when recording an audio message. The system also allows the operator to indefinitely suspend recording by pressing the keyboard space bar.

U.S. Pat. No. 5,353,259, issued to Howes et al., entitled "VOICE MESSAGE RECOVERY SYSTEM AND METHOD" discloses a system for storing voice messages in designated mailboxes.

Several portable voice recording systems have also been patented. For example, U.S. Pat. No. 5,235,571, issued to Ellermeier, entitled "DICTATION MACHINE WHICH IS HAND-HELD IN OPERATION" discloses a hand-held dictation machine which records speech on a magnetic-tape cassette.

Another example is U.S. Pat. No. 5,477,511, issued to Englehardt, entitled "PORTABLE DOCUMENTATION SYSTEM." The Englehardt system discloses a portable device for recording speech into a specific predetermined data structure for later transmission to a computer for conversion into text. The device stores the speech using nonvolatile solid-state memory and transmits the data to a computer using an infrared transmitter.

It is therefore apparent that health care workers need to conveniently, accurately, and thoroughly document medical procedures during the performance thereof. None of the above devices, however, provides a portable hands-free documentation system that, in combination with a computer, automatically converts recorded speech to text according to the present invention.

SUMMARY OF THE INVENTION

The present invention provides a hands-free voice recording and transcribing device comprising a portable recording unit including a housing attachable to a user's body and a storage medium, such as a high capacity floppy disk, received within the housing. A microphone is coupled to the housing, whereby circuitry therewithin converts analog voice signals from the microphone to digital signals and records the signals as data onto the storage medium. Various buttons on the housing are used to enter a security code to activate the recording assembly and to record or replay speech. The invention also includes a voice operated relay (VOX) for activating the record mode only upon detecting a user's voice.

The housing includes an output port for transmitting data from the recording unit to a computer via a cable for automatic conversion of the data into text. The portable housing also features a pen holder and an identification window for exposing an identification label on the storage medium when the medium is received therein.

In view of the above, it is an object of the present invention to provide a device attachable to a user's body that allows a health care worker to digitally record speech while the worker is performing a given task.

It is yet another object of the present invention to provide a recording assembly that can transmit recorded voice data to a computer to automatically convert the data to text.

It is yet another object of the present invention to reduce the time associated with documenting medical procedures, thus allowing medical workers to devote more time to other tasks.

It is yet another object of the present invention to provide a recording assembly having a security means for denying access to unauthorized users.

It is yet another object of the present invention to provide a portable, digital voice recording assembly that uses removable storage media allowing multiple users to record and archive digitally recorded data.

Other objects, features and advantages of the present invention will become readily apparent from the following detailed description of the preferred embodiment when considered with the attached drawings and the appended claims.

DESCRIPTION OF THE PREFERRED EMBODIMENTS

Figure 1:
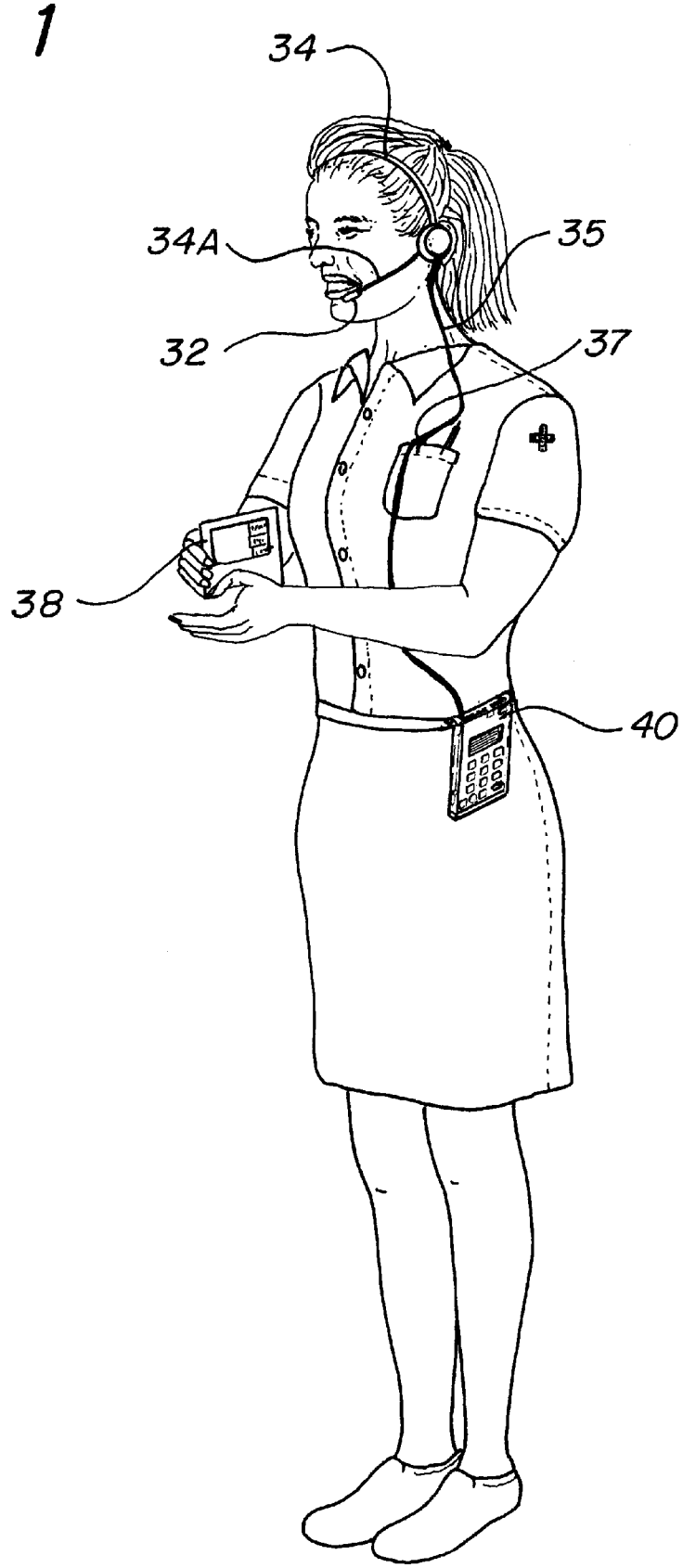
FIG. 1 illustrates the portable hands-free digital voice recorder housing of the present invention worn by a nurse.
Figure 2:
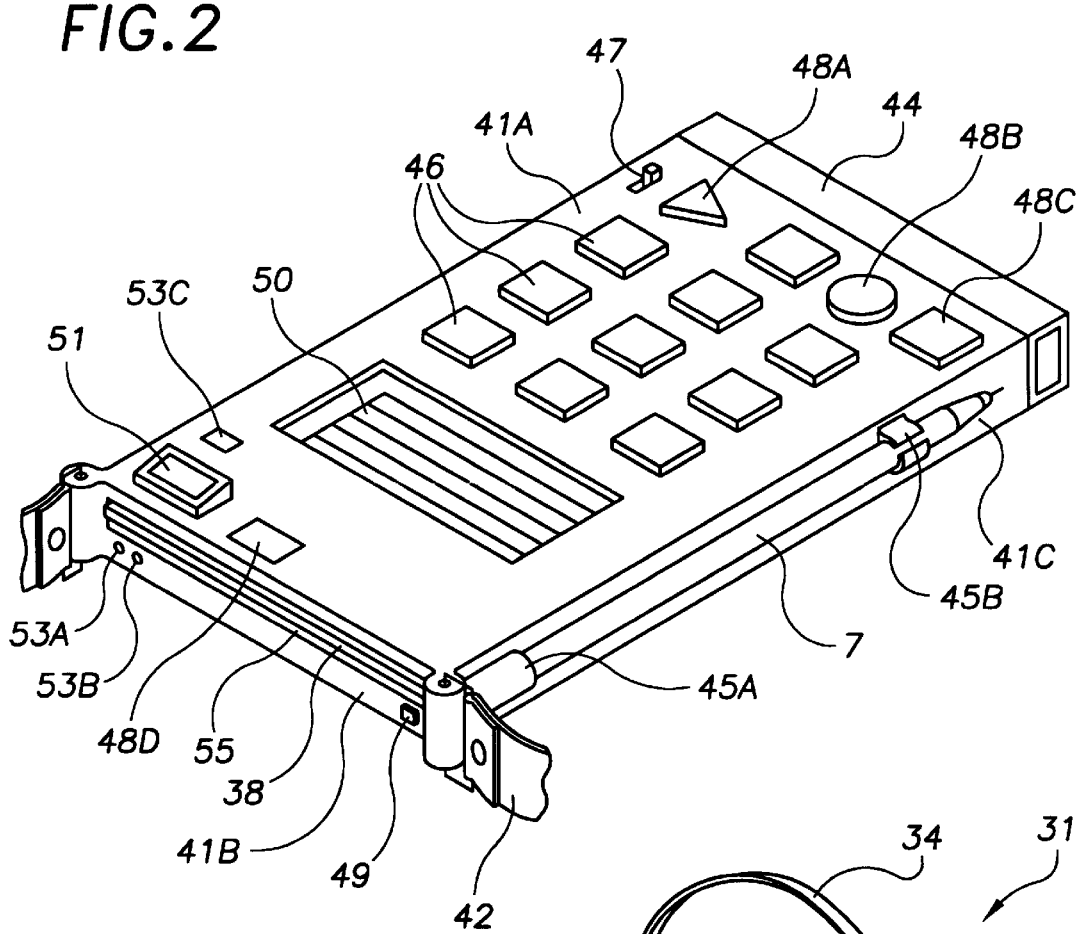
FIG. 2 illustrates a perspective view of the recording unit with a removable data storage medium inserted therein.
Figure 3:
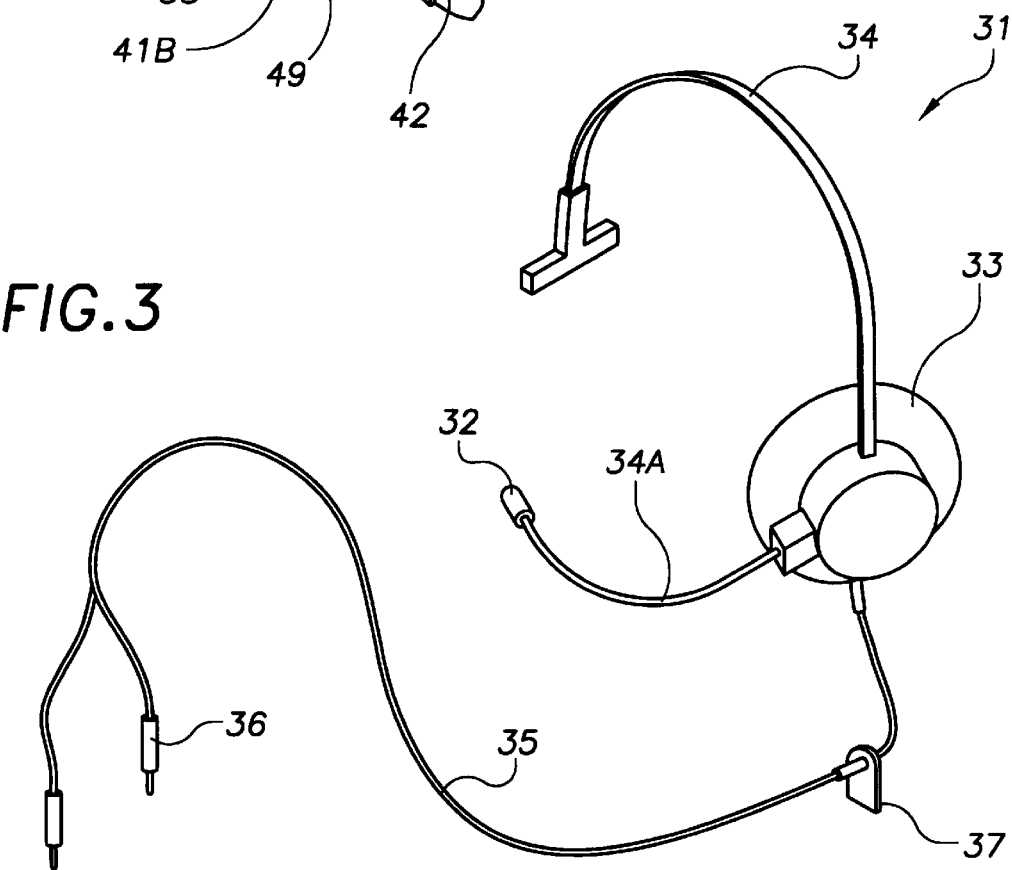
FIG. 3 illustrates a perspective view of the headset.
Figure 4:
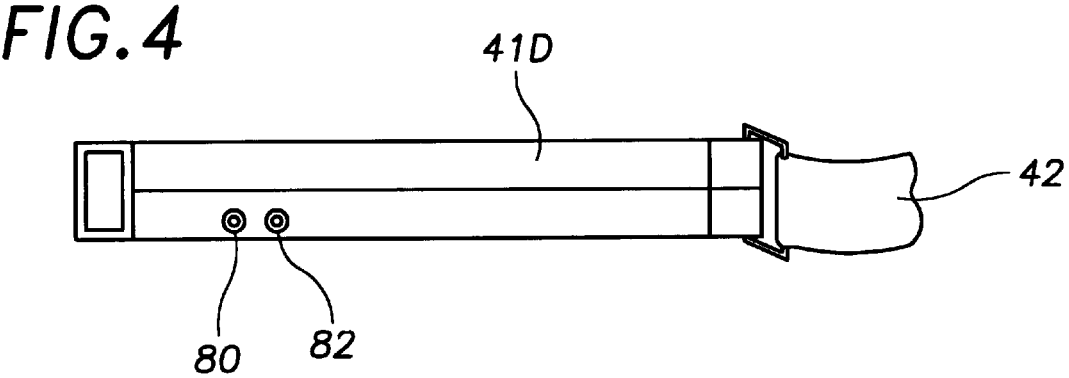
FIG. 4 illustrates a side view of the recording unit.
Figure 5:
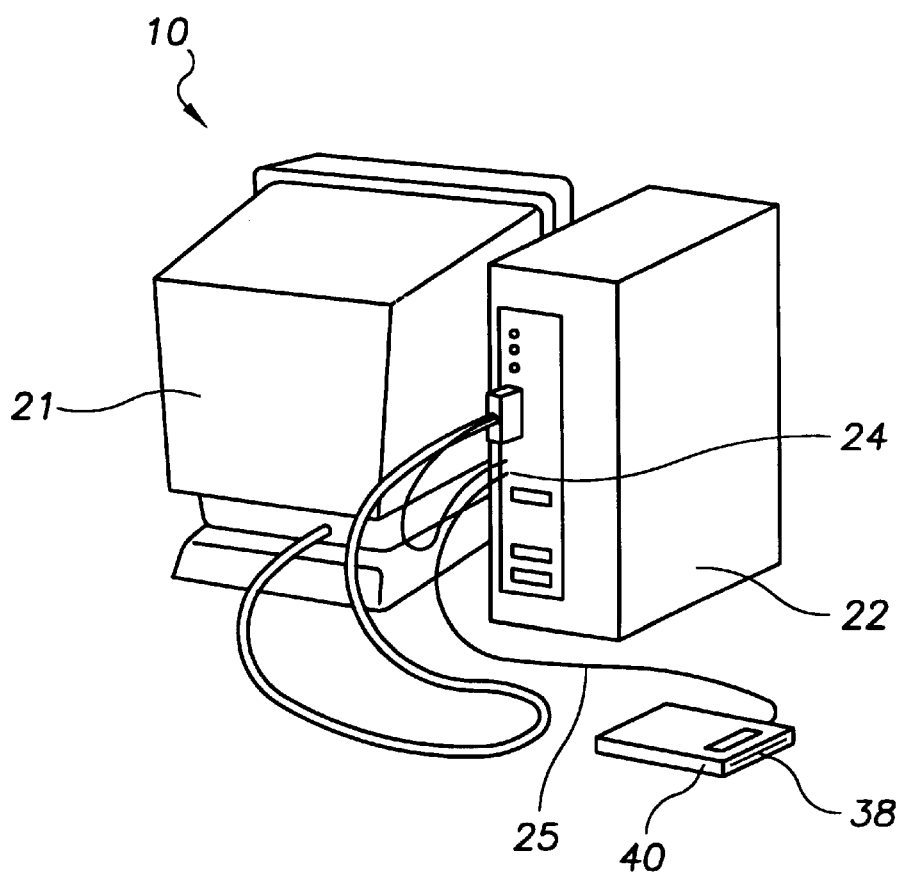
FIG. 5 illustrates the connection between the recorder and a computer.

Referring now to FIGS. 1 through 7, the preferred embodiment of the recording unit 10 of the present invention comprises a housing 40 containing a data storage medium 38 and a central control circuit for converting analog signals to digital signals, and vice versa, and for recording such digital signals to and reading them from the data storage medium. In the preferred embodiment, the data storage medium is a high capacity computer disk 38, allowing a user to conveniently remove or replace the disk.

Accordingly, the housing 40 includes a computer disk drive 43 that stores digital signals on the disk 38. The disk drive 43 is preferably designed to utilize disks with capacities of at least approximately 100 megabytes, such as the disks marketed under the ZIPDISK trademark. However, the recorder could easily be adapted to other types of data storage media without departing from the spirit of the present invention.

The housing 40 also includes a front panel 41a, a back panel (not shown), a top panel 41B, a bottom panel, a first side panel 41C, and a second side panel 41D. Pivotally coupled to opposite sides of the top panel 41B is an adjustable strap 42 which can be looped over a user's shoulder or secured about a user's waist to removably attach the housing 40 to the user. The top panel 41B also includes an elongated slot 55 for removably receiving the disk 38 and a button 49 for ejecting the disk 38 from the housing 40.

Disposed on the front panel 41A are a time display 51 and a plurality of buttons in communication with the recorder central control circuit, including play 48A, record 48B, stop 48C, time-stamp 48D and numeric 46 buttons. The symbols on the buttons are oriented so that when the housing is attached to a user and the front panel is rotated to a horizontal position, the symbols appear right side up to the user. The front panel 41A also includes a large aperture 50 that provides a disk identification window so that a label or similar identifiable portion of the disk is readily accessible when the disk 38 is inserted into the housing 40.

The first side panel 41C includes a pen holder for conveniently storing a writing instrument, such as a pen 7. The pen holder includes a pen receiving member 45A adapted to receive one end of the pen 7 and a clip member 45B for receiving the opposing end.

The second side panel 41D includes input and output ports 80 and 82 in communication with the central control circuit. A microphone 32 transmits analog electrical signals to the housing 40 response to sound waves. In the preferred embodiment, the microphone 32 includes a cable 35 having a plug 36 that is coupled with the input port 80. The microphone 32 is secured proximal the user's mouth with a removable attachment means, such as a headset 31 including a head securing band 34 and an arm 34A extending from an earpiece 33. The microphone 32 is secured to the end of the arm 34A. The cable 35 also includes an attachment means, such as an alligator clip 37, for attaching the cable to a user's body, thereby preventing the cable from hindering movement of the user.

The recorder unit also preferably includes a power source, such as one or more rechargeable battery means 44, to provide power to the recorder components, a voltage regulator 69 and a separate charging unit 70 for recharging the battery means. A battery strength detector 66 is connected to an audible alarm means, such as a piezo buzzer 68, for audibly alerting a user whenever the battery strength is below a predetermined level.

A security means, including a keypad 46 and a security code processor 67, is in communication with the battery 44 and the central control circuit. The security means disables power to the recorder until a valid security code is entered into the keypad 46. A visual indicator 53C in communication with the security means provides visual indication when a valid security code has been entered. In the preferred embodiment, the visual indicator 53C is a green LED disposed on the front panel 41 A of the recording unit.

Figure 6:
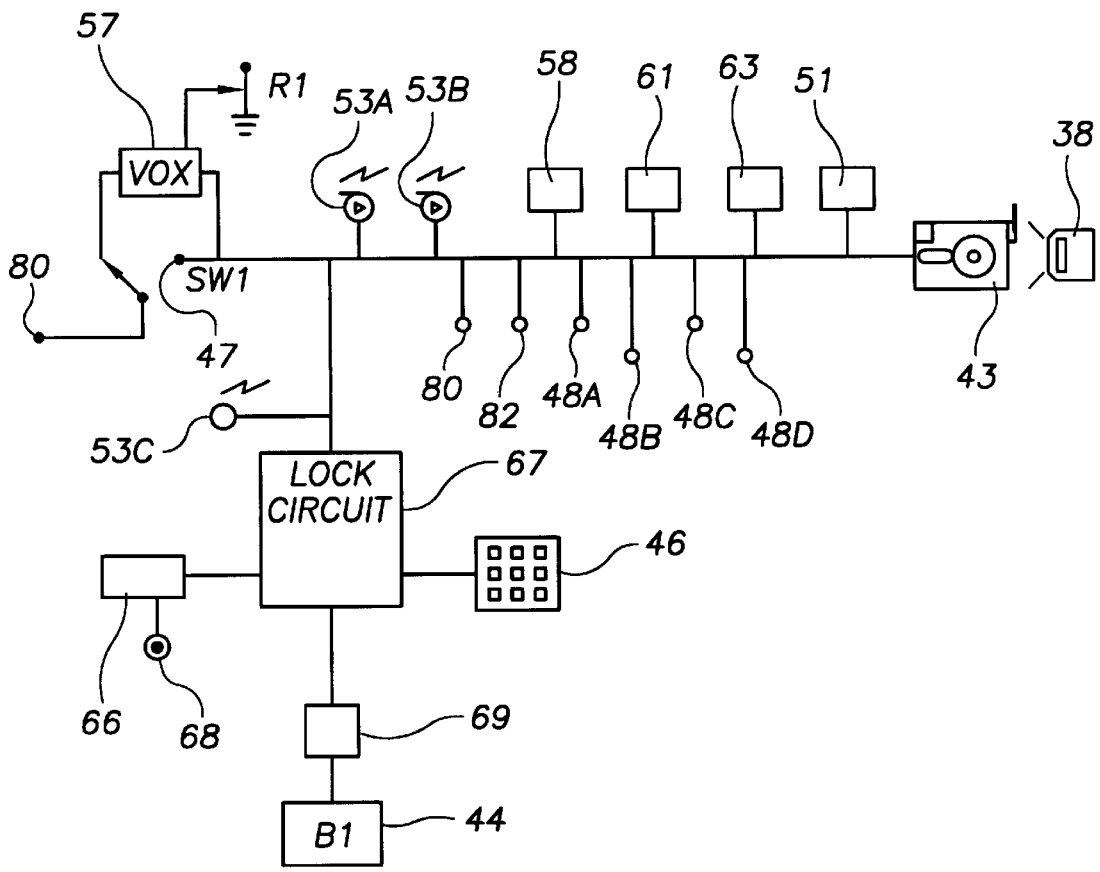
FIG. 6 illustrates the central control circuit of the recorder.
Figure 7:
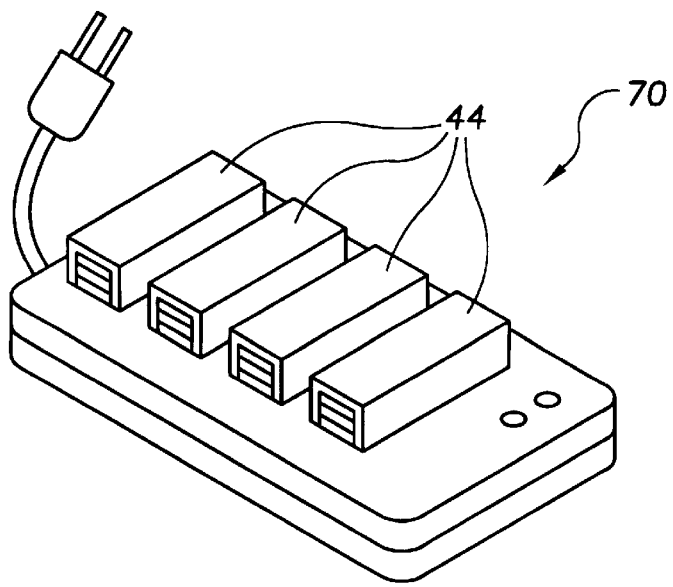
FIG. 7 illustrates a perspective view of the battery charger of the present invention.

Now referring to FIG. 6, the central control circuit includes a sound card 58 in communication with the input port 80. The sound card 58 includes an analog-to-digital converter (ADC), which converts analog input signals into digital output data, and a digital-to-analog converter (DAC), for converting digital data back to analog signals. The sound card also includes a digital signal processor (DSP), which compresses the digital data transmitted to the disk 38 and decompresses the digital data read therefrom. The instructions that the DSP uses to perform those tasks are stored in read only memory (ROM). The ADC, DAC, DSP, and ROM are conventional items and no further discussion is necessary.

The central control circuit further comprises a disk drive controller 61 in communication with the play 48A, record 48B, and stop 48C buttons, and the disk drive 43. When the recorder is active and the record button 48B is depressed, analog signals are transmitted from the microphone 32 to the disk drive 43 via the ADC and DSP where, under the direction of the disk drive controller 61, the signals are recorded onto the disk 38.

The central control circuit also communicates with a voice operated relay (VOX) 57. When activated, the VOX 57 disables the record mode unless the VOX 57 is detecting a user's voice. The VOX 57 can be deactivated by means of a VOX switch 47 on the recording unit housing 40 to continuously record whenever the record button 48B is depressed.

The recording unit also includes a clock/calender module 63 in communication with a display 51, such as a liquid crystal display, for displaying the current time whenever the recorder is active. The clock/calender module 63 also communicates with the disk drive controller 61 and a time/date stamp switch 48D on the front panel 41A of the housing 40. Pressing the switch 48D instructs the clock/calender module 63 to transmit a digital signal to the disk 38 via the disk drive controller 61 thereby labeling the data with the appropriate date and time.

The recorder also includes a cable 25 for establishing communication between the recorder and a conventional computer. The conventional computer includes continuous speech recognition software such as IBM's VIA VOICE GOLD™ or a similar program that works in conjunction with word processing software such as, without limitation, Microsoft Word™ and Corel WordPerfect™.

When the play button 48A is pressed, the disk drive 43 reads digital data from the disk 38 and transmits it to the DSP of the sound card 58. The DSP decompresses the data and sends it to the DAC where the data is converted to analog. The data is then transmitted to the computer via a unidirectional audio cable link coupled to the audio out port 82. Disposed on the top panel 41B are light means 53A and 53B in communication with the central control circuit for visually indicating the recorder's mode of operation, i.e. record or play.

In operation, user 5 places a new, removable data storage medium 38 in the portable hands-free voice recording unit housing 40 and places the headset 31 onto his or her head. The user dates the events by pressing the time/date stamp button 48D and then presses record function button 48B. The worker may then dictate a procedure, a report or similar activity whereby his or her voice is recorded and stored onto the removable data storage medium 38. Upon completion of the task, the data is transferred to the central processing unit 20 by attaching the cable 25 to audio out port 82 and to a conventional computer. The speech recognition software, is placed into a "dictate" mode and the play button 48A is depressed, whereby the recorded voice data is transmitted to the voice recognition software which, in combination with word processing software, converts the data to text. The resulting text may then be viewed on a computer monitor 21 or printed to create a written document of the events recorded. While not shown, central processing unit 20 is typically provided with a keyboard (not shown) which may be used to edit the text as necessary.

While the exemplary embodiment describes the present invention as being used by nurses and other medical practitioners, the device can be used for limitless other applications such as real time documentation of an autopsy, a police incident, an emergency situation and similar events.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A portable hands-free voice recording and transcription device comprising:
   a portable housing attachable to a user's body;
   a voice transmission means removably coupled with said portable housing and securable to a user's body for hands-free operation;
   a recording and playback means for processing analog voice signals from said transmission means wherein said recording and playback means includes a disk drive received within said housing; a floppy disk removably received within said disk drive; means for converting an analog signal received from said voice transmission means to a digital signal and storing said digital signal onto said storage medium; means for reading said digitally stored signal, converting said signal to an analog, output signal and transmitting said signal to an external speech recognition software to convert said analog output to text;
   a voice activation means in communication with said recording means for enabling said recording means upon said voice activation means detecting a user's voice;
   a security means for preventing unauthorized users from accessing said playback and recording means, said security means including a plurality of keypad members, each keypad member having discrete identifying indicia thereon which are depressed in a select, predetermined sequence; a battery in communication with said keypad members, said recording means and said playback means; a disabling circuit in communication with said keypad members and said battery for delivering power to said recording and playback means upon a said keypad members being depressed in the select, predetermined sequence.

2. The portable hands-free voice recording and transcription device according to claim 1 wherein said voice transmission means is a headset securable to a user's head, said headset having a microphone mounted thereon, said microphone positioned adjacent the user's mouth when said headset is secured to the user's head.

3. The portable hands-free recording assembly according to claim 1 further comprising an alert means for indicating a low strength condition of said battery.

4. The portable hands-free recording assembly according to claim 1 wherein said portable housing further comprises:
   an identification window formed in a front panel of said portable housing, said window overlaying an identifying label on said disk, allowing a user to readily access said storage medium when said storage medium is received within said housing.

5. The portable hands-free recording assembly according to claim 1 further comprising:
   a pen receiving member attached to said housing for receiving a first end of said pen;
   a clip member attached to said housing which provides a clamping force to a second end of said pen to secure said pen to said housing.

6. A portable hands-free recording assembly according to claim 1 wherein said recording and playback means further comprises:
   a play button for enabling said playback means to transmit said analog signal to an external conversion means;
   a record button for activating said recording means;
   a stop button for disabling said recording and playback means.

7. A portable hands-free recording assembly according to claim 1 further comprising:
   a time stamp button in communication with a clock and calendar module for digitally labeling recorded speech with current time and date information.

8. A portable hands-free recording assembly according to claim 1 further comprising a disk eject button on said housing for ejecting said disk from said housing.

9. A portable hands-free recording assembly according to claim 1 further comprising a time display means on said housing for displaying current time.

10. A portable hands-free recording assembly according to claim 6 wherein said external conversion means and said housing are interlinked with an audio cable via which said output signal is transmitted.

11. A portable hands-free recording assembly according to claim 1 wherein said disk drive is a conventional floppy disk drive.

12. The portable hands-free recording assembly according to claim 1 further comprising an adjustable strap pivotally coupled to opposing sides of a top panel of said housing which is looped over a user's shoulder and secured about a user's waist to secure the housing to the user.

13. The portable hands-free recording assembly according to claim 1 wherein said disk drive is configured to receive and operate high capacity floppy disks.

14. The portable hands-free recording assembly according to claim 1 wherein said storage medium is a floppy disk having a capacity of at least 100 megabytes.

\* \* \* \* \*